(12) United States Patent
Mansfield

(10) Patent No.: US 7,470,093 B2
(45) Date of Patent: Dec. 30, 2008

(54) INTERLOCKING SEAWALL CONSTRUCTION AND INSTALLATION APPARATUS

(76) Inventor: Peter W. Mansfield, P.O. Box 338, Urbanna, VA (US) 23175-0338

( * ) Notice: Subject to any disclaimer, the term of this patent is extended or adjusted under 35 U.S.C. 154(b) by 117 days.

(21) Appl. No.: 11/729,387

(22) Filed: Mar. 28, 2007

(65) Prior Publication Data

US 2007/0193129 A1  Aug. 23, 2007

Related U.S. Application Data

(63) Continuation-in-part of application No. 11/170,196, filed on Jun. 28, 2005, now abandoned.

(51) Int. Cl.
*E02D 29/02* (2006.01)
(52) U.S. Cl. ............... 405/284; 405/274; 405/279; 405/15
(58) Field of Classification Search ............ 405/15, 405/31, 262, 274–281, 284, 285
See application file for complete search history.

(56) References Cited

U.S. PATENT DOCUMENTS

| | | | |
|---|---|---|---|
| 738,346 A | 9/1903 | Mouchel | |
| 841,762 A | 1/1907 | Bates | |
| 905,771 A | 12/1908 | Upson | |
| 910,421 A | 1/1909 | Schlueter | |
| 1,693,311 A | 11/1928 | Miller et al. | |
| 2,101,285 A * | 12/1937 | Fenton | 405/278 |
| 2,128,428 A * | 8/1938 | Murray, Jr. | 405/278 |
| 2,439,606 A | 4/1948 | Hurt | |
| 2,465,557 A | 3/1949 | Thornley | |
| 3,016,117 A | 1/1962 | Petersen | |
| 3,410,095 A * | 11/1968 | Turzillo et al. | 405/270 |
| 3,411,305 A * | 11/1968 | Cella | 405/280 |
| 3,636,718 A | 1/1972 | Keats | |
| 3,739,588 A | 6/1973 | Schroter et al. | |
| 3,899,891 A | 8/1975 | Kelly et al. | |
| 4,006,600 A | 2/1977 | Guild | |
| 4,023,374 A | 5/1977 | Colbert | |
| 4,075,859 A | 2/1978 | Guild | |
| 4,110,989 A | 9/1978 | Selkirk | |
| 4,124,983 A | 11/1978 | Weatherby | |
| 4,132,082 A | 1/1979 | Merjan | |

(Continued)

FOREIGN PATENT DOCUMENTS

JP   58110714 A  *  7/1983

*Primary Examiner*—Frederick L. Lagman
(74) *Attorney, Agent, or Firm*—Charles J. Prescott

(57) ABSTRACT

A seawall element and installation apparatus therefor, the seawall element including an elongated plastic tubular member having a uniform hollow elliptic or oval-shaped cross section and open at each end thereof. The tubular member has a cylindrically-shaped male portion and cavity interlocking arrangement for interlocking two side by side tubular members together by slidable overlapping substantially watertight engagement lengthwise of one tubular member to another. A seawall structure includes a plurality of these seawall tubular members positioned side by side in self-locking engagement to form a row and supported by being supportively embedded into the earth. An elongated cast concrete reinforcing cap extends along and interconnects an upper end portion of each of the seawall tubular members and extends monolithically into each of the tubular member upon deployment. An apparatus for water jetting each tubular member into bottom ground is also disclosed.

4 Claims, 15 Drawing Sheets

U.S. PATENT DOCUMENTS

| | | |
|---|---|---|
| 4,199,277 A | 4/1980 | Merjan |
| 4,222,684 A | 9/1980 | Rosenstock |
| 4,268,192 A | 5/1981 | Colle |
| 4,322,181 A | 3/1982 | Streich et al. |
| 4,425,052 A | 1/1984 | McCullers |
| 4,439,071 A | 3/1984 | Roper, Jr. |
| 4,605,339 A | 8/1986 | Bullivant |
| 4,623,025 A | 11/1986 | Verstraeten |
| 4,761,098 A | 8/1988 | Lipsker |
| 5,051,285 A | 9/1991 | Borzakian |
| 5,240,348 A | 8/1993 | Breaux |
| 5,320,453 A | 6/1994 | Bullivant |
| 5,378,082 A | 1/1995 | Hiller et al. |
| 5,593,247 A | 1/1997 | Endres et al. |
| 5,628,583 A | 5/1997 | Gibson |
| 5,651,641 A | 7/1997 | Stephens et al. |
| 5,772,360 A | 6/1998 | Wood, II |
| 5,839,851 A | 11/1998 | Norfolk et al. |
| 5,934,826 A | 8/1999 | Mansfield |
| 6,048,139 A * | 4/2000 | Donovan, III ............... 405/284 |
| 6,062,771 A | 5/2000 | Roberts |
| 6,135,675 A | 10/2000 | Moreau |
| 6,224,294 B1 | 5/2001 | Mansfield |
| 6,312,196 B1 | 11/2001 | Mansfield |
| 6,427,402 B1 | 8/2002 | White |
| 6,435,768 B1 | 8/2002 | Mansfield |
| 6,732,483 B1 * | 5/2004 | White ....................... 52/592.1 |
| 7,172,371 B2 * | 2/2007 | Nickelson et al. ........... 405/279 |
| 7,278,800 B2 * | 10/2007 | Nickelson et al. ........... 405/274 |

* cited by examiner

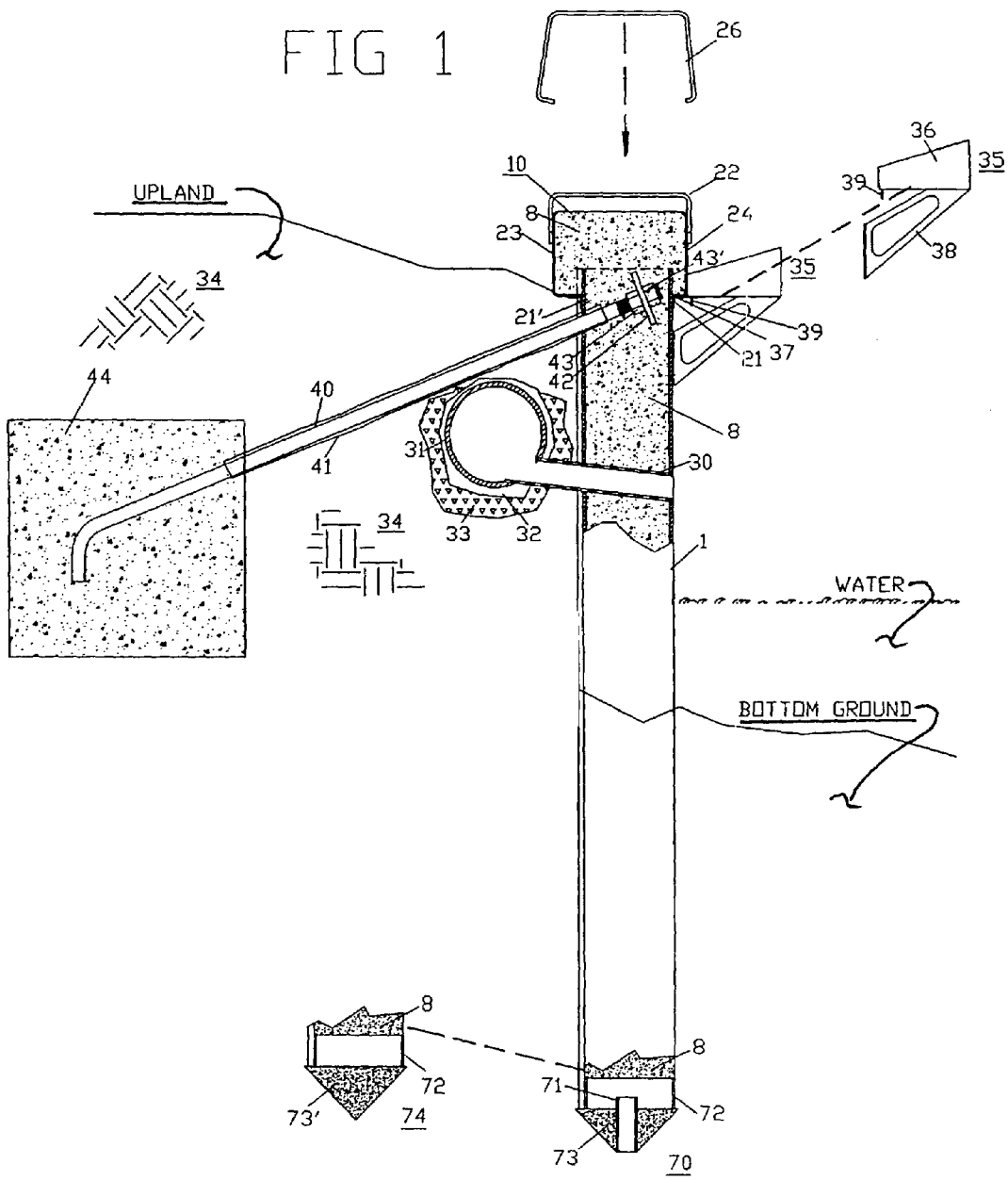

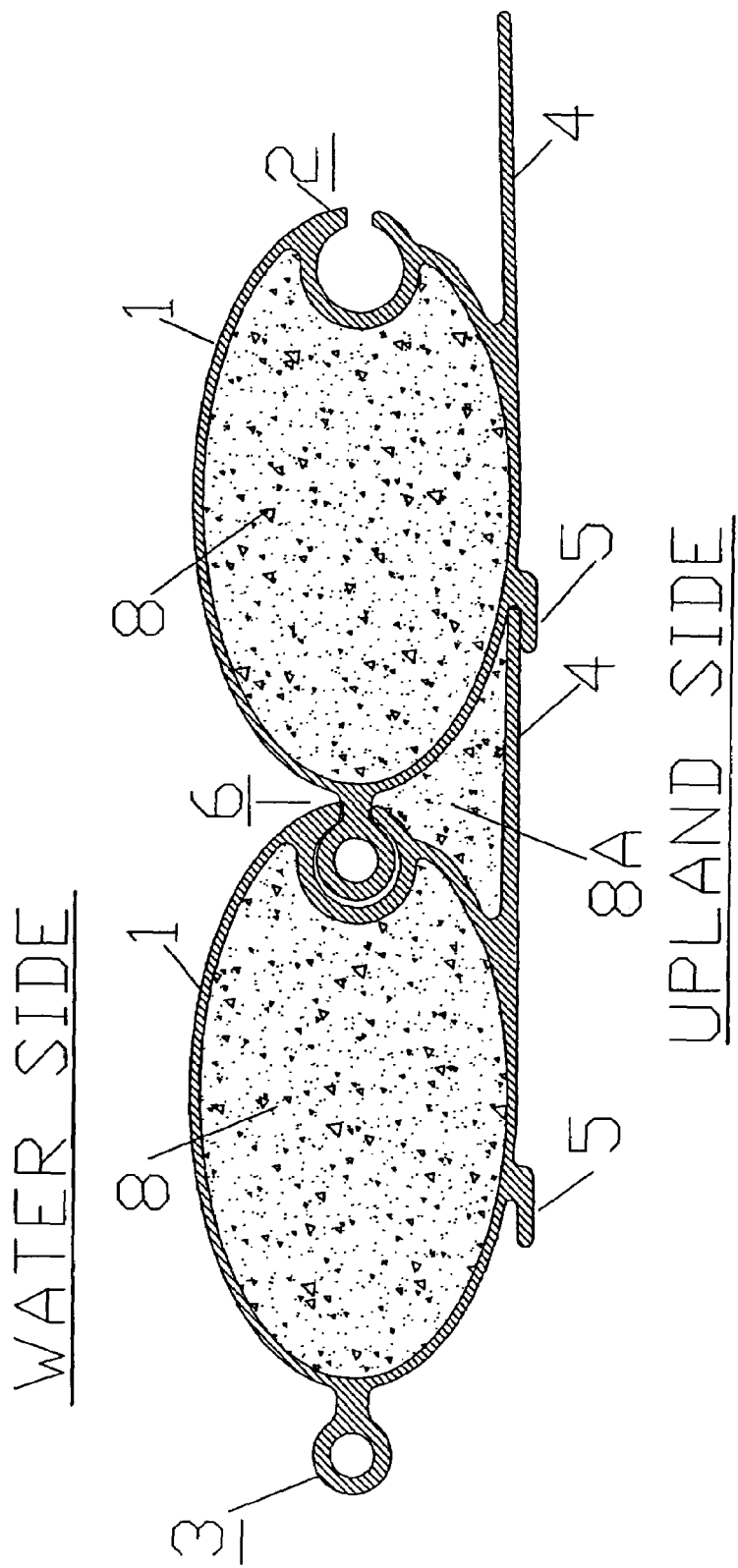

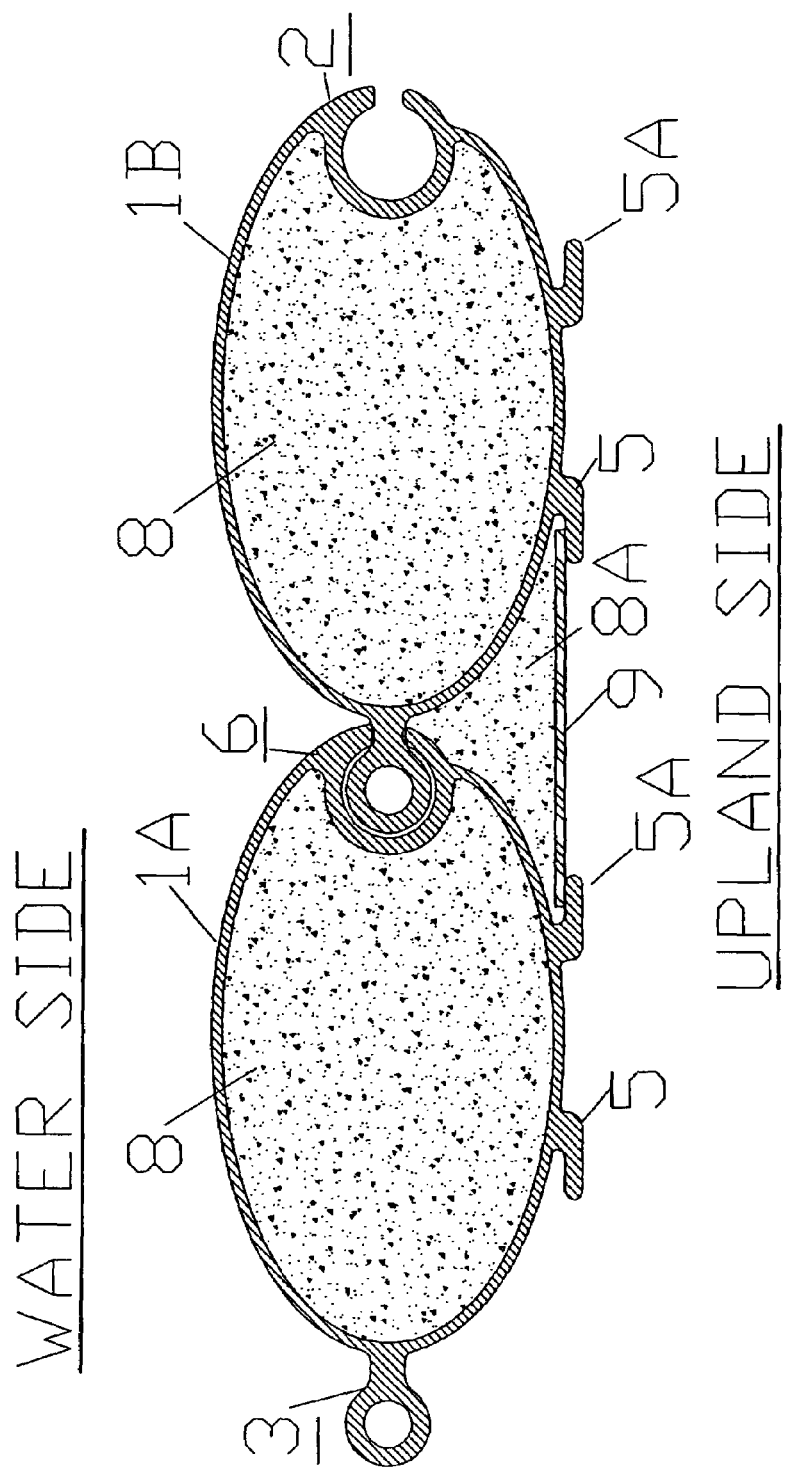

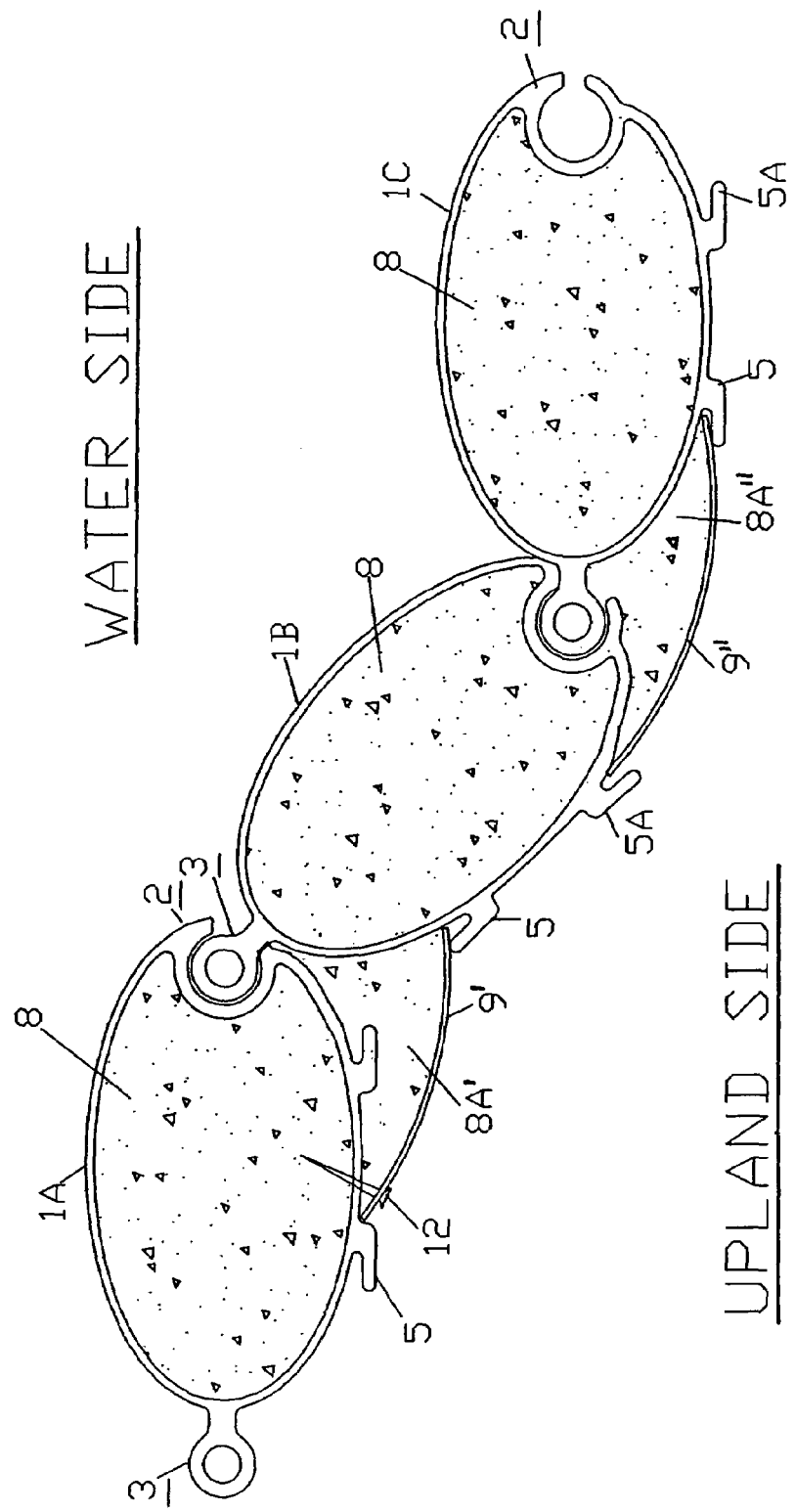

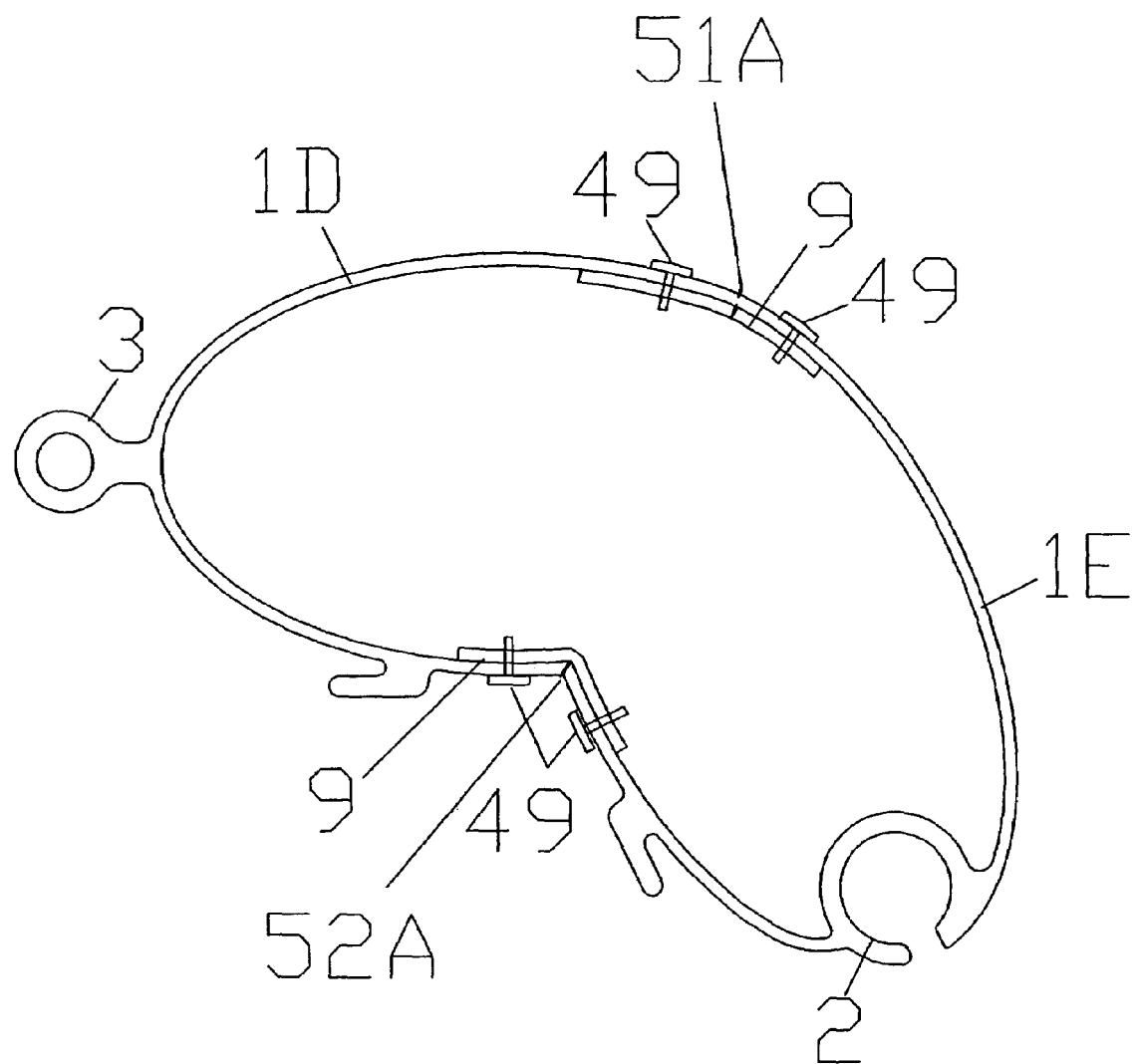

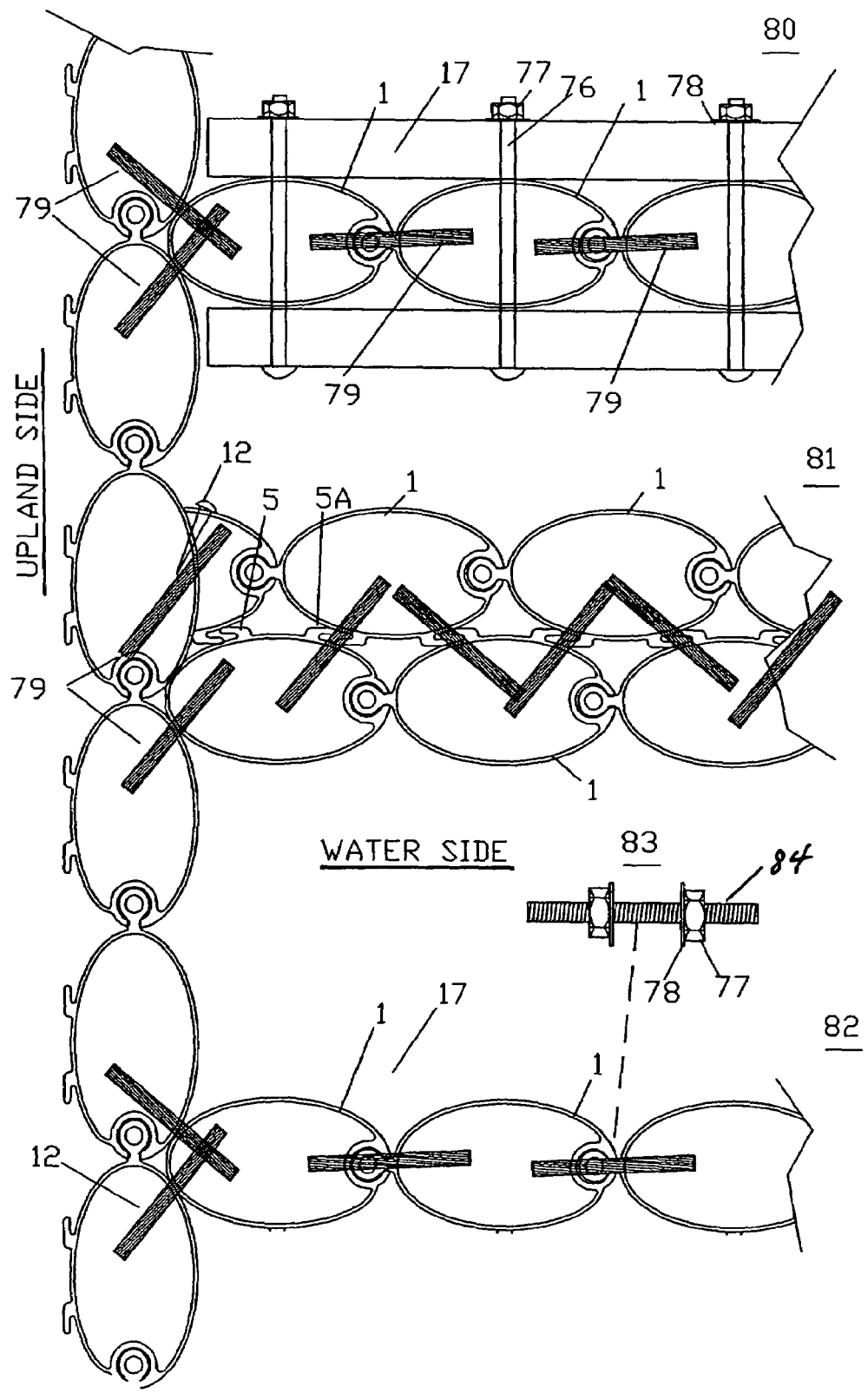

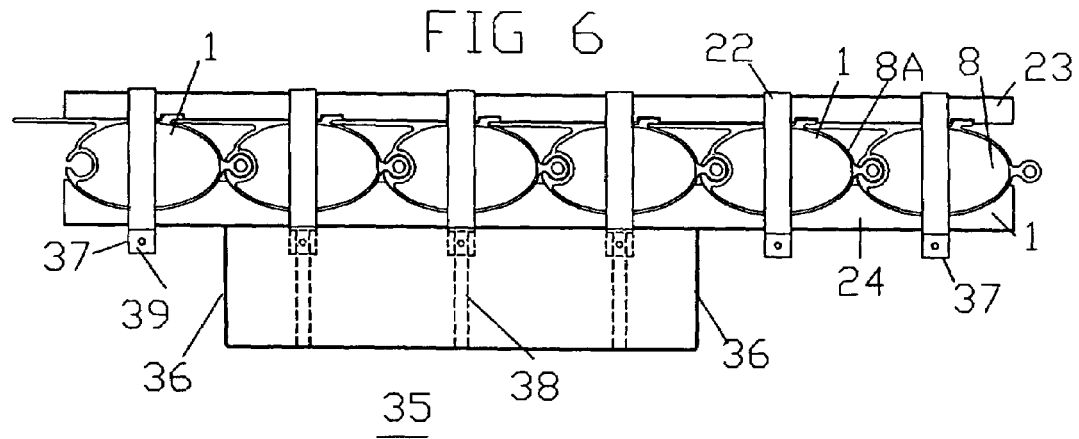
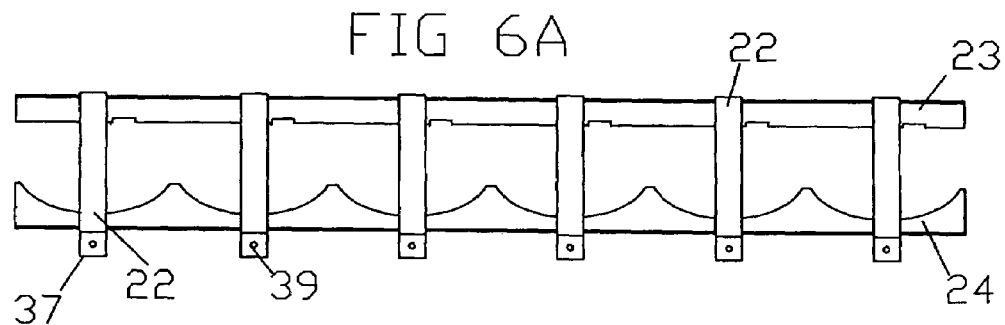
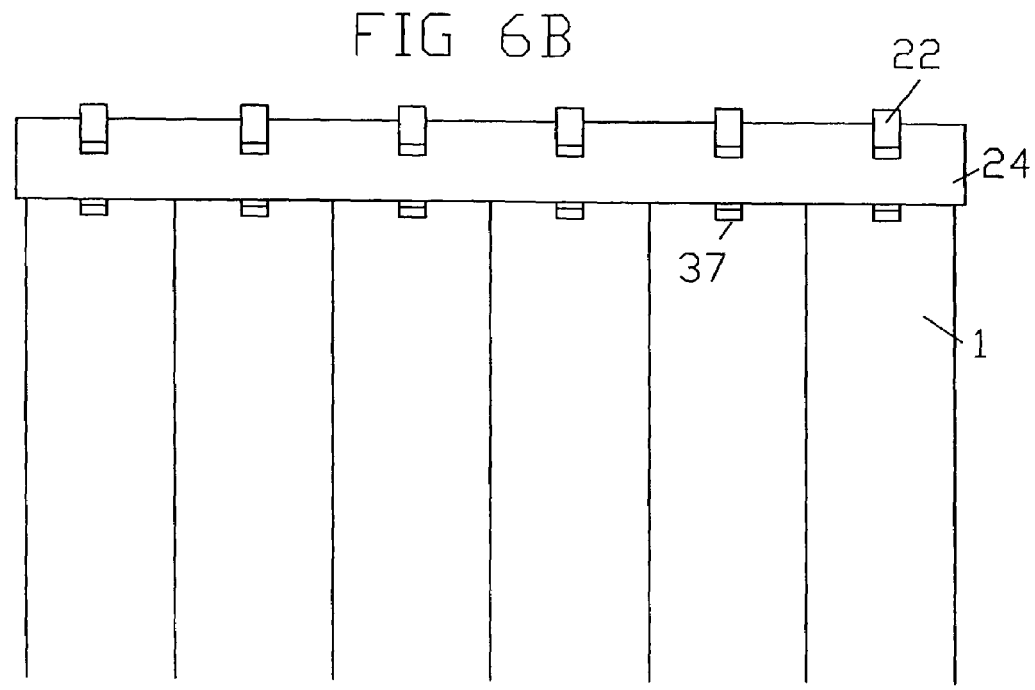

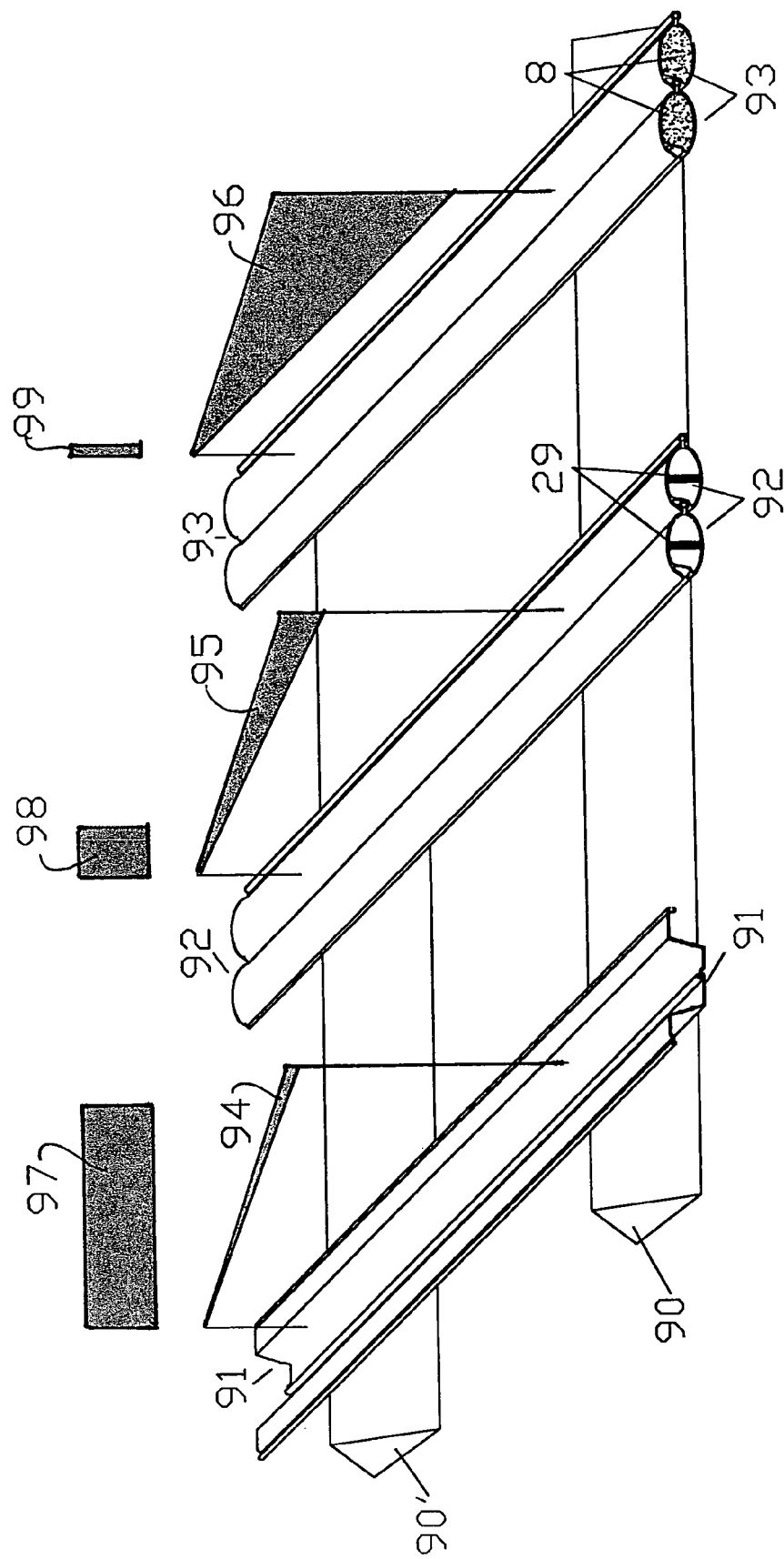

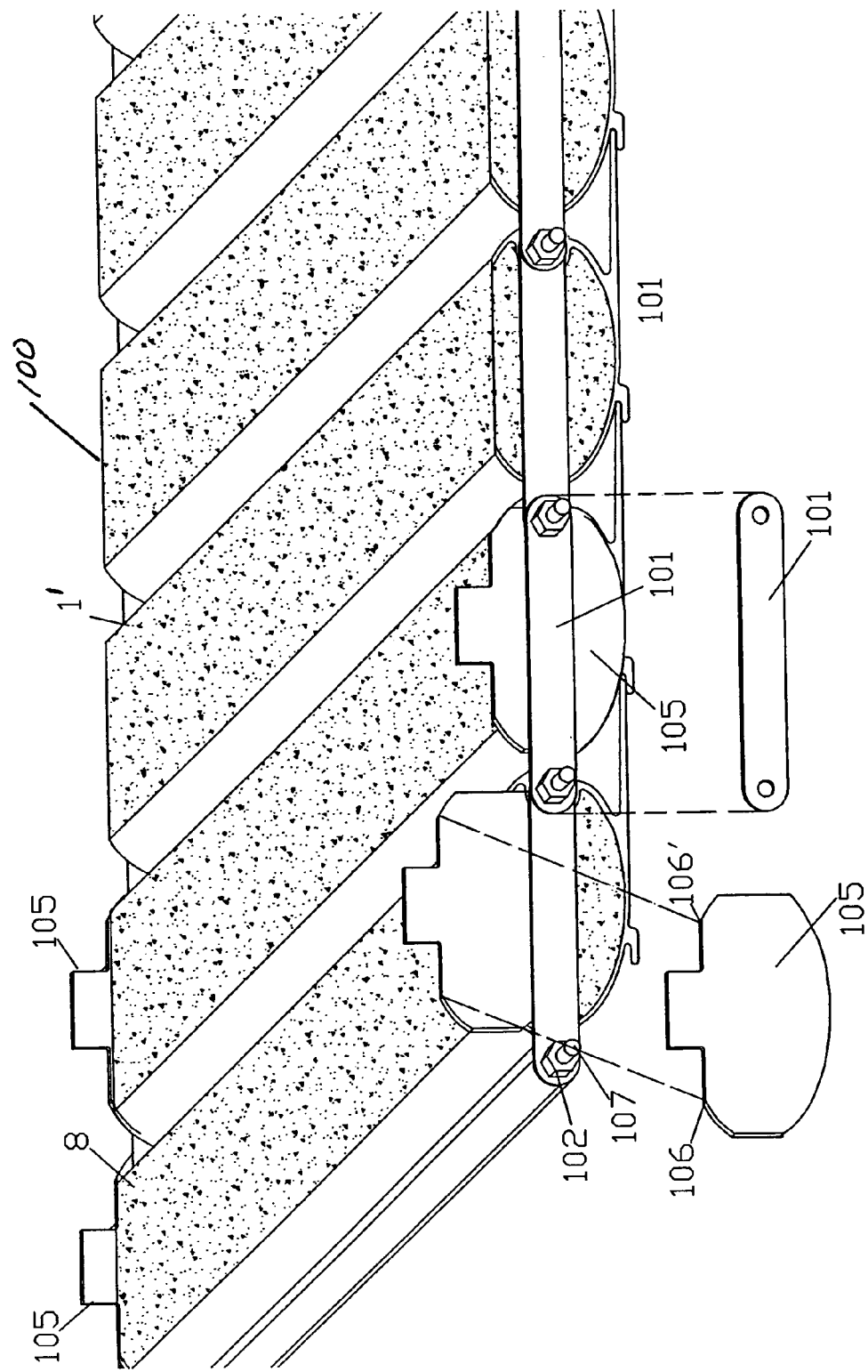

US 7,470,093 B2

INTERLOCKING SEAWALL CONSTRUCTION AND INSTALLATION APPARATUS

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to a seawall or barrier imposed between up lands and a body of water defining the limits of each and particularly wherein the seawall is composed of a plurality of elongated oval-shaped tubular members or sections. The bottom of each section is buried into the ground by methods well known to the industry or by use of a special apparatus disclosed herein. There are two separate interlocks between each of the sections to prevent leakage of ground materials from the upland into the water. The integrity of the interlocks may be further enhanced by filling the included area between the interlocks with a hardening material such as concrete.

2. Description of Related Art

Seawalls are typically constructed utilizing formed or rolled steel or other metallic material panels which interlock together edge to edge as each elongated panel of the seawall is installed and embedded or driven into the ground adjacent a body of water. Each of the interlocking seawall panels is typically formed of steel and includes some corrosive resistant feature, particularly when deployed adjacent a body of salt water. However, such seawalls are known to be relatively short lived and must be replaced periodically due to rust and electrolysis at considerable expense. Interlocking PVC material is also used, but must be reinforced with pilings and longitudinal members known as walers.

Prior art patents include the following:
U.S. Pat. No. 738,346 issued to Mouchel
U.S. Pat. No. 905,771 issued to Upson
U.S. Pat. No. 910,421 issued to Schlueter
U.S. Pat. No. 1,693,311 issued to Miller et al.
U.S. Patent No. 2,439,606 issued to Hurt
U.S. Pat. No. 3,739,588 issued to Schroter et al.
U.S. Pat. No. 4,023,374 issued to Colbert et al.
U.S. Pat. No. 4,124,983 issued to Weatherby
U.S. Pat. No. 4,222,684 issued to Rosenstock
U.S. Pat. No. 4,268,192 issued to Colle
U.S. Pat. No. 4,425,052 issued to McCullers
U.S. Pat. No. 4,439,071 issued to Roper, Jr.
U.S. Pat. No. 4,605,339 issued to Bullivant
U.S. Pat. No. 4,761,098 issued to Lipsker
U.S. Pat. No. 5,240,348 issued to Breaux
U.S. Pat. No. 5,378,082 issued to Hiller, et al.
U.S. Pat. No. 5,593,247 issued to Endres et al.
U.S. Pat. No. 5,628,583 issued to Gibson
U.S. Pat. No. 5,651,641 issued to Stephens, et al.
U.S. Pat. No. 5,772,360 issued to Wood II
U.S. Pat. No. 5,839,851 issued to Norfolk, et al.
U.S. Pat. No. 5,934,826 issued to Mansfield
U.S. Pat. No. 6,135,675 issued to Moreau
U.S. Pat. No. 6,224,294 issued to Mansfield
U.S. Pat. No. 6,312,196 issued to Mansfield
U.S. Pat. No. 6,427,402 issued to White My previous U.S. Pat. No. 5,934,826 addresses, in part, one of the difficulties of using anything other than the conventional interlocking steel panels to form a seawall. In this patent, I teach the use and deployment of tubular pilings formed of p.v.c. plastic material. Prior to the teaching in this patent, the use of such plastic tubular material was not well known. Two important aspects facilitating this invention were there disclosed, namely, a method and apparatus for embedding a plastic tubular piling into the water bed and a driving apparatus and method for deploying tubular plastic pilings into the water bottom.

Another previous U.S. Pat. No. 6,312,196 adds to this teaching and expands it into the area of seawall construction. By incorporating a tubular member formed of p.v.c. with sufficient strength, the expected service life of such seawalls is greatly extended because of the inert nature of p.v.c. material. That invention was directed to a seawall anchored into ground adjacent a body of water comprising a plurality of elongated tubular members arranged in upright side by side relation one to another forming a seawall section, a lower portion of each tubular member embedded into, and receiving support from, the ground along an edge of the body of water and method of installation thereof. An elongated generally horizontal rebar-reinforced concrete cap extends along, and rigidly interconnects together, each upper end portion of each of the tubular members. The cap is cast formed in place after the tubular members are installed. Each tubular member is preferably rebar-reinforced and substantially filled with a cured aggregate reinforcement. A layer of filter cloth is held in place by fill dirt placed against the land or dry side of the seawall to substantially prevent fill dirt placed against the dry side of tubular members from washing into the body of water between adjacent tubular members. A tie back is connected at each end thereof to, and extending between, the cap and a ground anchor spaced from the tubular members.

The first interlock of the present invention is formed by a common ball and socket arrangement such that each section contains a ball along one edge and an open grooved socket along the other edge of each section. The second interlock is formed by a thin membrane that is pre-formed during the section manufacturing to exert a slight biased pressure against the adjoining section. A female locking tab further assures that the membrane nests against the adjoining section, and cannot separate during installation.

All tubular sections or members are designed for cement filling while forming a concrete cap utilizing a unique set of forms which may be flexible to allow for a degree of non-linearly of the sections to create bends or rigid to assure parallel alignment of the tubular members. After the cement cures and the forms are removed, a preformed matching thermoplastic cap can be snapped into place for both aesthetic and utilitarian enhancement.

BRIEF SUMMARY OF THE INVENTION

The invention is directed to a thin wall hollow oval shaped tubular member, preferably extruded polypropylene, polyvinyl chloride or the like, with a ball at one end of the cross section thereof and an open mating slot at the other or distal end of the cross section from one tubular member. A flexible thin fin or plate extends to a mating slot in the next adjacent tubular member, or alternatively, a thin sheet metal or polyvinyl chloride flat stock extends between facing slots on each of the tubular members to define a triangular cavity between the fin or plate and the outer surfaces of the adjoining tubular members that may also be filled with cement in a monolithic pour with the elliptical tubular members and the formed cap.

The elliptical or oval tubular members are driven and/or jetted into place by a special lightweight apparatus that combines both a vibratory or impact action and a water jet that both washes and drives each tubular member to the required depth in the bottom ground. The upper ends are then cut to the desired uniform height.

The formed cap is defined by flexible angle pieces that attach to the sidewalls of the tubular members slightly below the top and conform to the exterior profile of the multiple sections. Strength of the cap may be increased by laying common reinforcement bars along the length of the seawall. After the addition of the reinforcement bars, the top of two flexible angle pieces are strapped together to obtain parallelism of the angle sidewalls.

Before making the monolithic pour of cement that bonds the sections and creates the cap, all required tiebacks and drainage piping must be placed and held in position while the small aggregate cement is poured and vibrated around these auxiliary enhancements. Access to produce a monolithic pour is gained through the top of the open channel formed by the two parallel sides of the angle walls, which act as a funnel to direct the cement into the seawall sections. A movable sheet metal or plastic catch basin may be used to catch any excess cement that spills over on the waterside during the pouring and leveling operation.

After the cement cures and the flexible angular forms are removed revealing an independent self supporting structure, a thermoplastic cap with flexible sidewalls and bent lips can be deformed by bending the lips sufficiently apart to allow the unit in the lengthwise direction to slip over the cured concrete cap providing an aesthetically pleasing appearance, protection of the concrete cap and protection of any boat laying against the structure.

It is therefore an object of this invention to disclose a hollow oval shaped tubular seawall member with a ball at one end of the oval and an open mating slot at the distal end designed such that the ball of one end engages and mates with the open slot of the adjacent section.

It is a further objective of this invention to disclose a hollow oval shaped tubular seawall member with a ball at one end and an open mating slot at the distal end designed such that the ball of one end engages and mates with the open slot of the adjacent section, and also including a thin fin or plate that extends from the minor axis of the exterior of the oval on the upland side and extends into a mating slot in the adjacent section.

It is a further objective of this invention to disclose a hollow oval shaped tubular member with a ball at one end and an open mating slot at the distal end designed such that the ball of one end engages and mates with the open slot of the adjacent section, each section also including a thin fin or plate that extends from the minor axis of the exterior of the oval on the upland side and extends into a mating slot in the adjacent section, and defines generally a triangular section that can be filled with concrete to further protect the ball and open mating slot connection.

It is a further objective of this invention to disclose a hollow oval shaped tubular member with a ball at one end and an open mating slot at the distal end designed such that the ball of one end engages and mates with the open slot of the adjacent section, further including a separate thin plate that extends from, but not attached to a slot in the first seawall member to a second slot and so forth in such a manner that each plate covers and lends extra protection to the aforementioned ball and socket set between each section.

It is a further objective of this invention to disclose a hollow oval shaped tubular member with a ball at one end and an open mating slot at the distal end designed such that the ball of one end engages and mates with the open slot of the adjacent section, further including a separate thin plate that extends from but not attached to a slot in the first seawall member to a slot second and so forth in such a manner that each plate covers and lends extra protection to the aforementioned ball and socket set between each seawall member, and defines generally a triangular section which may be filled with concrete to further protect the ball and open mating slot connection.

And it is a further objective of this invention that the material of the hollow oval shaped tubular member be extruded polypropylene, polyvinyl chloride material or the like using an ultraviolet stable material formulation.

And it is a further objective of this invention to provide a vibratory driver with jet apparatus for securing the oval tubular members into the bottom ground.

And it is a further objective of this invention to provide a jetting apparatus that locates the wash water directly under the leading edge of each elliptical or oval seawall member.

And it is a further objective of this invention to provide a water jetting apparatus that directs a stream of wash water into the female slot directly in front of the mating male ball protrusion.

And it is a further objective of this invention to provide a water jetting apparatus that during use encapsulates the bottom ground solids forming a plug that can be readily removed along with the inner bell of the jetting device for disposal on the upland side of the seawall or other acceptable disposal methods.

And it is a further objective of this invention to provide a set of forms in right angle configuration that can be flexed to conform with the small non-lineal disposition of each tubular seawall member.

And it is a further objective of this invention to provide a set of forms in right angle configuration that are rigid to impose straight line disposition of the tubular members until such time as the cement cures and the forms can be removed.

And it is a further objective that the set of angular forms act as a catch basin and funnel for filling the hollow oval members and the triangular section formed by the thin membrane and the land sidewalls of the oval tubular members.

And it is a further objective that the set of angular forms act as a catch basin and funnel for filling the hollow oval sections and the triangular sections and is further protected from spills during the filling and leveling operations by a movable waterside catch basin attached and temporarily supported thereby.

And it is a further objective of this invention that a monolithic concrete structure can be obtained by a making a single pour of cement in the oval tubular members, the triangular section and the cap, formed by the boundaries of the angular cement forms.

And it is a further objective of this invention to disclose a method of forming all degrees of turns of the sections, on the job site, from plus or minus 90 degrees from the run of the previous section using the above said oval or elliptical seawall members.

And it is a further objective of this invention to disclose a method of forming all degrees of turns of the tubular seawall member from plus or minus 90 degrees from the run of the previous member with a resultant structural strength greater than the straight run member strength.

And it is a further objective of this invention to disclose a method of embedding tiebacks at any level through the land side wall of the oval tubular members thereby avoiding protrusions on the water side that suffer the corrosive effects of water exposure, or cause possible damage to a vessel tied along side of the seawall.

And it is a further objective of this invention to disclose a seawall system with a markedly reduced number of walers and a tie back system, thereby eliminating or greatly reducing the protrusions on the water side of the seawall and providing improved aesthetic value, less corrosive effects to the seawall structure and eliminating possibly damage to water vessels laying along side of the seawall.

And it is a further objective of this invention to provide a preformed thermoplastic cap that can be deformed to fit over the cured monolithic concrete cap for aesthetic purposes, protection of the concrete cap and protection of any vessel laying along side of the seawall.

And it is a further objective of this invention to provide a preformed low profile thermoplastic cap and triangular fill pieces that fit over the elliptical seawall ends for aesthetic purposes and protection of any vessel laying along side of the seawall.

And it is a further objective of this instant invention to disclose a system of non-corrosive interlocking thermoplastic tubular members that when filled with concrete approach the strength of conventional concrete slabs or steel sheet piling while avoiding the detritus effects of salt water erosion and corrosion.

And it is a further objective of this instant invention to disclose a system of interlocking thermoplastic tubular members that can be easily installed in a body of water, evacuated and filled with cement without additional costly forming or other protection to the cement during curing.

And it is a further objective of this instant invention to disclose a system of interlocking thermoplastic tubular members that is less costly to install, more durable, less prone to leakage and requires less invasive equipment in sensitive wetland areas than sheet steel, or concrete slab construction.

And it is a further objective of this instant invention to disclose a system of interlocking thermoplastic tubular members that when installed presents a waterside sinusoidal profile resulting in disruption of the reflected wave action.

And it is a further objective of this instant invention to disclose a system of interlocking thermoplastic tubular members that can be filled with cement within the hollow tubular members, triangular section and unitizing cap to approach a uniform sectional strength.

And it is a further objective of this instant invention to disclose a system of interlocking thermoplastic tubular members that can be reinforced with an inexpensive, commercially available structural member preferably a wood product or the like inserted inside the body of the individual tubular members.

And it is a further objective of this instant invention to disclose a system of interlocking thermoplastic tubular members designed to allow for expansion and contraction of the base material and concrete with out sacrificing the integrity of the joints between the seawall tubular members.

And it is a further objective of this instant invention to disclose a sacrificial drive tip that, when attached to the lower end of the oval section, displaces the water, mud and dirt of the bottom ground enhancing the integrity of the cement filling by eliminating the need to remove the above foreign matter.

And it is a further objective of this instant invention to disclose a conical sacrificial jet drive tip with a open end that, when attached to the lower end of the hollow oval tubular member and pressurized with water, displaces the mud and dirt from the path of the seawall tubular member, permitting the seawall tubular member to sink into position with minimum driving assistance, requiring only a pump-out of the water in the seawall chamber prior to cement filling.

And it is a further objective of this instant invention to disclose a system of interlocking thermoplastic tubular members that, when cut lengthwise and joined with corrosion resistant steel links, forms a semi-flexible concrete mat that can be pulled into place to provide a bearing surface for wheeled traffic.

In accordance with these and other objects which will become apparent hereinafter, the instant invention will now be described with reference to the accompanying drawings.

BRIEF DESCRIPTION OF THE SEVERAL VIEWS OF THE DRAWING(S)

FIG. 1 is a side elevation view in partial section of a completed seawall showing the elliptical seawall tubular member, tieback system, drainage system, concrete angular forms and the concrete cap with thermoplastic cover.

FIG. 2 is a top plan section view of two adjacent tubular members of the seawall showing the intersecting ball and socket and inside fin and showing the areas of the poured-in-place concrete.

FIG. 2A is a preferred alternate embodiment of FIG. 2.

FIG. 3 is a plan view of the seawall tubular members making turns of up to ±45 degrees one to another.

FIG. 4 is an example of the use of two cut seawall tubular members connected together to form a reinforced oblique 45 degree or greater turn.

FIG. 5 is a plan view of three groin abutments including the positioning of embedded reinforcement rods.

FIG. 6 is a top plan view of scallop-shaped concrete forms for concrete filling of the tubular members and forming the seawall cap, including a spill catch basin.

FIG. 6A is a top plan view of the scallop-shaped concrete forms and tie-bars.

FIG. 6B is a side elevation view of FIG. 6.

FIG. 7 is a perspective view comparing the strength and strength/cost ratio of a commercially available steel "Z" section, a reinforced elliptical seawall tubular member and a concrete filled elliptical seawall tubular member.

FIG. 10 is a perspective view of a secondary use of a variation of the invention.

LIST OF COMPONENTS

Figure 1A:
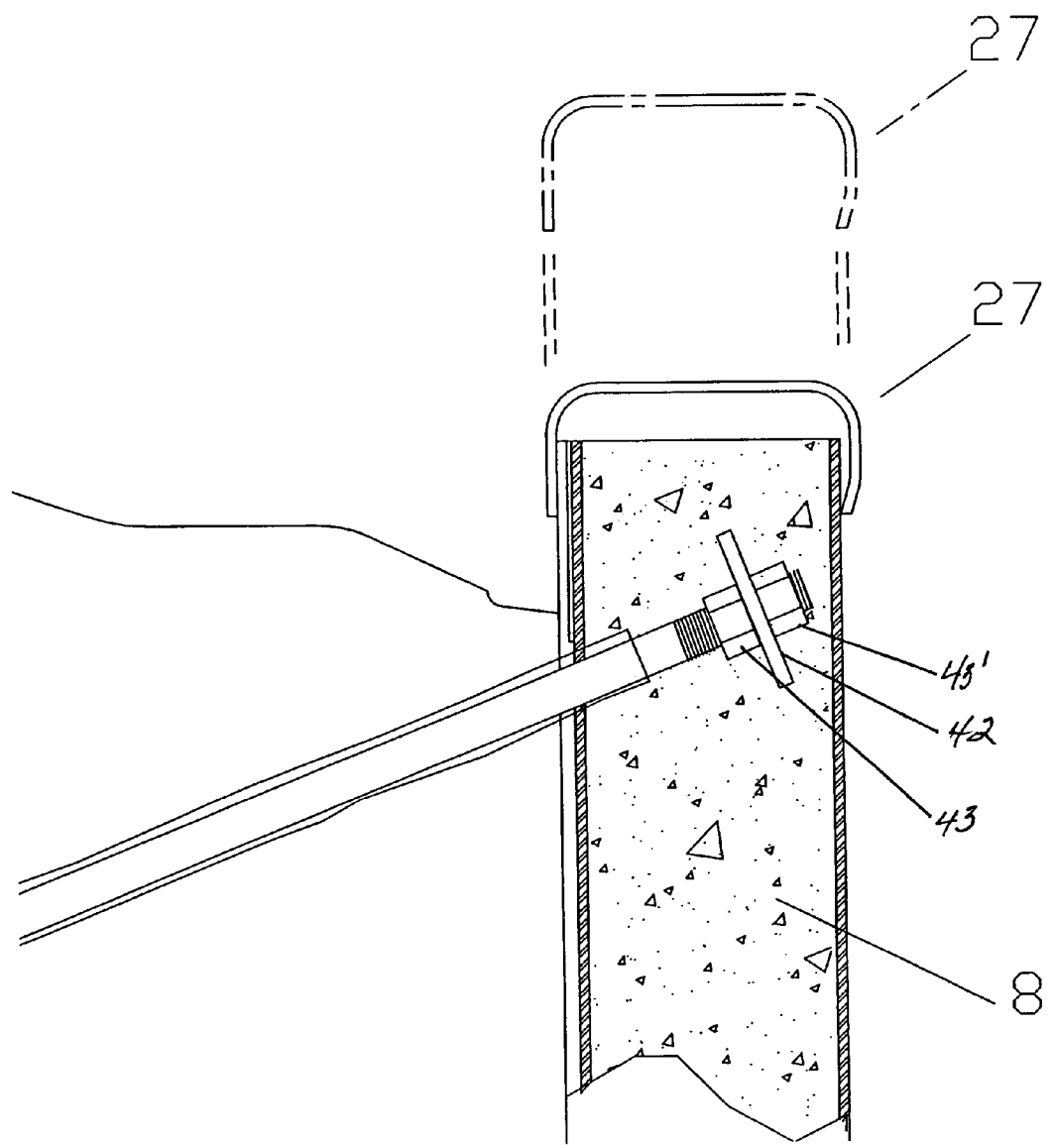
FIG. 1A is an enlarged elevation view in section of a low profile formed cover.

| | |
|---|---|
| 1. | Seawall tubular member |
| 1'. | Modified seawall tubular member |
| 1A, 1B, 1C | Alternate seawall tubular members |
| 1D | Fabricated 135° seawall tubular member |
| 1L, 1P, 1N, 1Q, 1R | Seawall tubular members |
| 2. | Female end socket |
| 3. | Male end ball |
| 4. | Fin |
| 5. | Fin receiving slot |
| 5A | Receiving slot |
| 6. | Joint |
| 8. | Concrete |
| 8A | Triangular concrete section |
| 8A' | Triangular concrete section |
| 8A" | Triangular concrete section |
| 9. | Plate |
| 9'. | Plate |
| 9". | Plate |
| 10. | Concrete cap |
| 11. | Fabricated 90° tubular member |
| 12. | Sheet metal screw |
| 13. | Angle plastic |
| 14. | Extruded 90° tubular member |
| 17. | Waler |
| 18. | Male tee end |
| 19. | Male socket end |
| 20. | Connection |
| 21. | Sheet metal screw |
| 21'. | Sheet metal screw |
| 22. | Spanner band |
| 23. | Scallop-like landside form |
| 24. | Scallop-like waterside form |
| 26. | PVC cover |
| 27. | Small PVC cover |
| 28. | Fill plate |
| 29. | Wood rebar |
| 30. | Drainage pipe |
| 31. | Drainage manifold |
| 32. | Filter cloth |
| 33. | Gravel bed |
| 34. | Upland ground |
| 35. | Concrete catch basin |
| 36. | Basin sidewall |
| 37. | Tab |
| 38. | Gusset |
| 39. | Pin |
| 40. | Tieback rod |
| 41. | Protective sheath |
| 42. | Large washer |
| 43. | Bolts |
| 44. | Concrete deadman |
| 45. | Applied force |
| 47. | Back water plates |
| 48. | Lag bolt |
| 49. | Fastener pop rivet |
| 51. | Splice point backside |
| 52. | Splice point inside |
| 57. | Water jet assembly |
| 58. | Cup |
| 59. | Length adjust |
| 60. | Water inlet |
| 61. | Height adjustment rod |
| 62. | Bell |
| 63. | Clearance |
| 64. | Socket wash |
| 67. | Centering pins |
| 68. | Thumb screw |
| 69. | Drive well |
| 70. | Jettable drive tip assembly |

-continued

LIST OF COMPONENTS

| | |
|---|---|
| 71. | Water channel |
| 72. | Glue band |
| 73. | Concrete cone |
| 74. | Drive tip assembly |
| 75. | Check valve |
| 76. | Tie bolt |
| 77. | Hex nut |
| 78. | Washer |
| 79. | Reinforcement bar |
| 80. | Single row jetty or groin |
| 81. | Double row jetty or groin |
| 82. | Single row jetty or groin |
| 83. | Threaded reinforcement |
| 84. | Tubular member interior |
| 86. | Interior of bell |
| 88. | Leading edge of tubular member |
| 90. | Support |
| 90'. | Support |
| 91. | Conventional seawall section |
| 92. | Tubular member w/wood reinforcement |
| 93. | Tubular member w/concrete fill |
| 94. | Load distribution |
| 100. | Boat ramp |
| 101. | Link bar |
| 102. | Nut |
| 105. | End plate |
| 106. | Cut edge |
| 107. | Tie rod bolts |

DETAILED DESCRIPTION OF THE INVENTION

Referring now to the drawings and particularly to FIG. 1, an elliptical tubular member 1 provides support for the upland grounds 34 with a pass through drainage pipe 30 in fluid communication with a commercially available perforated drainage manifold 31. Conventional filter cloth 32 is normally used to limit solids from entering the perforated drainage manifold 31 and a gravel bed 33 increases the effective drainage area.

Also shown in FIG. 1 is a typical tieback system including a tie rod 40 having a protective non-corrosive sheath 41 such as plastic pipe or shrink sleeving. Tie rod 40 is typically embedded within a poured concrete block 44 or dead man at one end in the upland 34 and, at the other end within the monolithic concrete fill 8 in the tubular member 1 as best seen in FIG. 1A. The tie rod 40 may be threaded on one or both ends to accommodate a large diameter washer or metal plate 42 and one or more common hex nuts 43 and 43'. An advantage of this seawall system is that there are no protrusions of the tie back system that extend through the waterside wall of any of the elliptical tubular members 1 which could damage a boat tied along side of the seawall or accelerate corrosion.

The elliptical seawall tubular members 1 are shown with the scallop-like concrete forms 23 and 24 in place and held in position with common sheet metal screws 21 and 21' and further held in parallel alignment by a metal spanner band 22. With these temporary concrete forms 23 and 24 and spanner band 22 in place, a virtual funnel is formed for the cement pour defined by the side walls of concrete forms 23 and 24. During the pour and while the concrete is leveled to the top of the forms 23 and 24, an angular sheet metal catch basin 35 is placed alongside and pin 39 protrudes downwardly through, and is supported by, the waterside concrete form 24 at receiver tab 37 and gusset 38. The catch basin 35 is moved along the form 24 as the cement pour progresses along the seawall.

These temporary concrete forms 23 and 24 and spanner band 22 are removed after the monolithic concrete 8 has cured sufficiently to be self supporting by pulling the metal spanner band 22 upward until the ends clear both of form 23 and 24. The fasteners 21 and 21' are then removed, permitting the forms 23 and 24 to be removed exposing a concrete cap 10.

The concrete cap 10 that extends the length of the seawall can be protected with a cover 26 preferably formed of extruded thermoplastic material. This cover 26 can be deformed and snapped into place to provide protection to the concrete cap 10 structure. It is aesthetically pleasing, and presents a significantly less abrasive surface to any water vessel lying along side of the seawall structure. Anchor screws (not shown) can be used to assure that the cover 26 remains in position.

FIG. 1 also shows the jettable drive tip generally at 70 with glue band 72 and a longitudinal water channel 71. The drive tip 70 is glued to the inside bottom of tubular member 1 to promote an even distribution of water to displace sand, mud and sediment by pressure water injected into the top of the tubular member and exiting through the water channel 71. The jettable concrete drive tip 70 is expendable. A like closed end drive tip 74 can also be employed that requires forcible driving methods rather than jetted water for ground penetration wherein the concrete tip 74 is solid.

FIG. 2 shows two of the elliptical seawall tubular members 1 connected together and including the monolithic concrete fill 8, the longitudinally extending female socket 2, the male ball protrusion 3, the fin extension 4 and the fin receiving slot 5. The monolithic concrete fill 8 is defined by the interior surface of each seawall tubular member 1 and the triangular section 8A that is defined by the arcuate facing landside facing surfaces of the exterior body of the elliptical seawall sections 1 and fin 4. Concrete fill in triangular section 8A both strengthens and provides additional leakage protection at joint 6, as well as providing a more uniform bending strength over the profile of the seawall by adding concrete section 8A in the weakest area of the seawall.

FIG. 2A is an alternative and preferred embodiment of the elliptical seawall tubular members 1A. The fin 4 shown in FIG. 2 is replaced with a separate metal or thermoplastic plate 9 and a second receiving slot 5A, the plate 9 being driven into position reducing the cost of the elliptical seawall tubular members 1A and 1B. Both embodiments in FIGS. 2 and 2A yield the desired and equal utilitarian result.

Figure 2B:
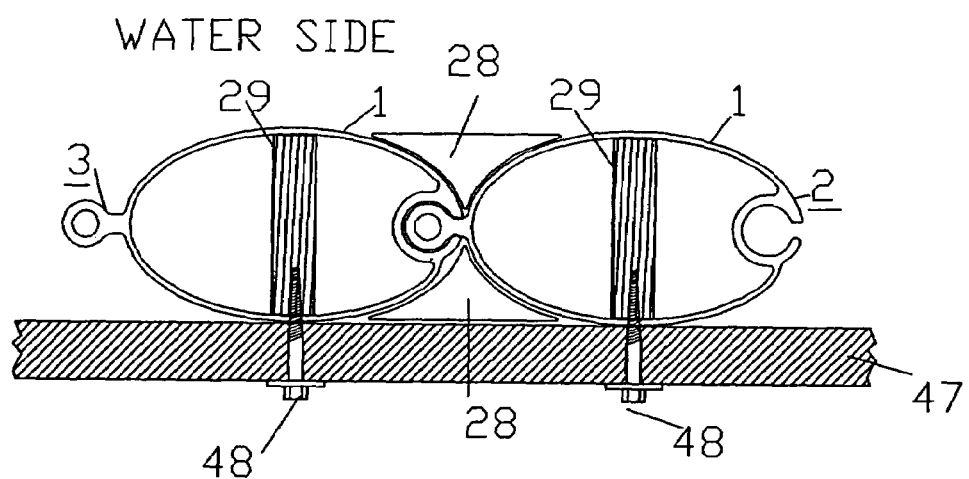
FIG. 2B shows an alternate method of stiffening the elliptical seawall tubular members without using a concrete fill.
Figure 2C:
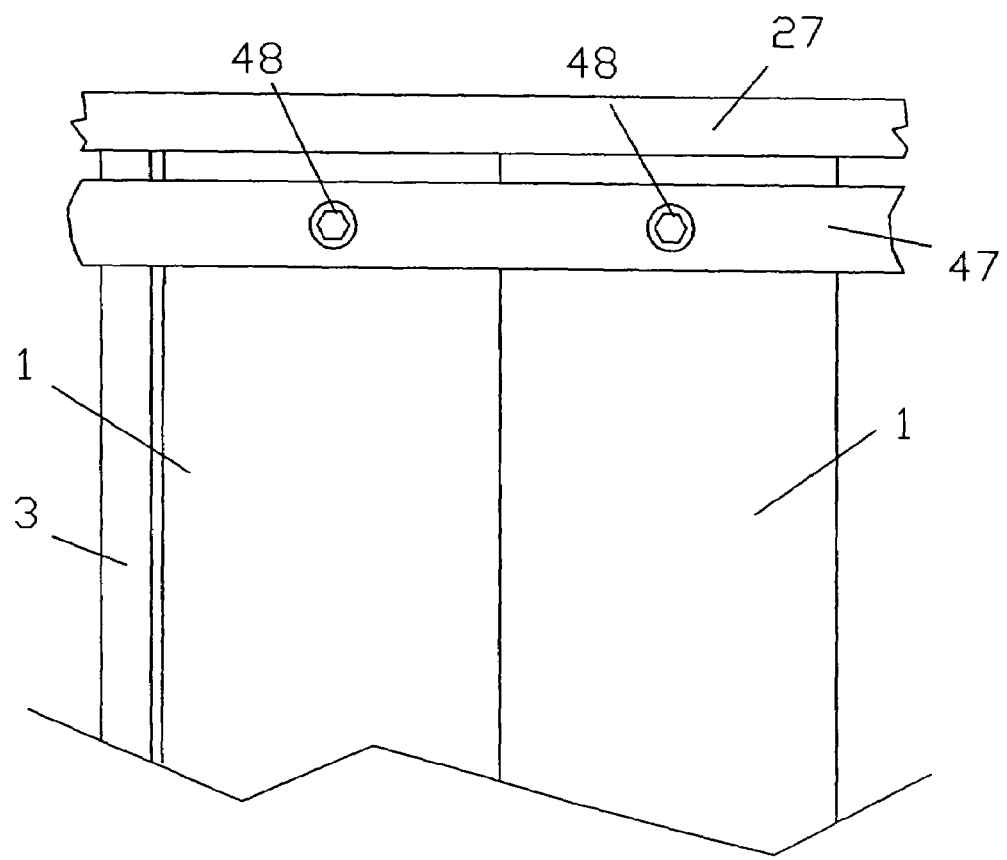
FIG. 2C is a side elevation view of FIG. 2B as viewed from upland or landside.
Figure 4B:
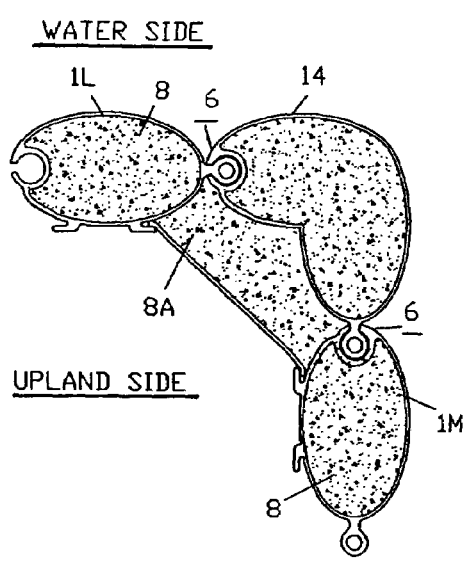
FIG. 4B through 4E are top plan views of right angle corners of a seawall using a manufactured 90 degree tubular member.
Figure 4C:
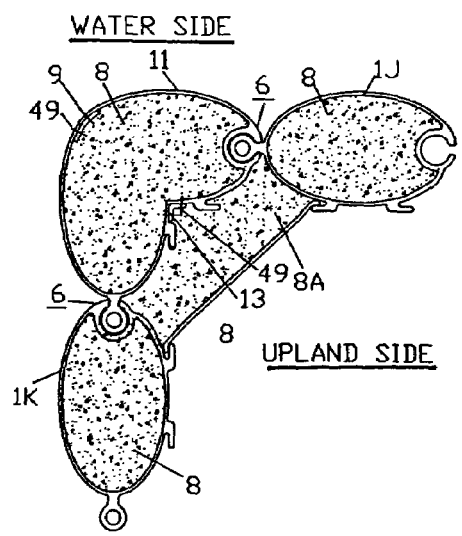
Figure 4D:
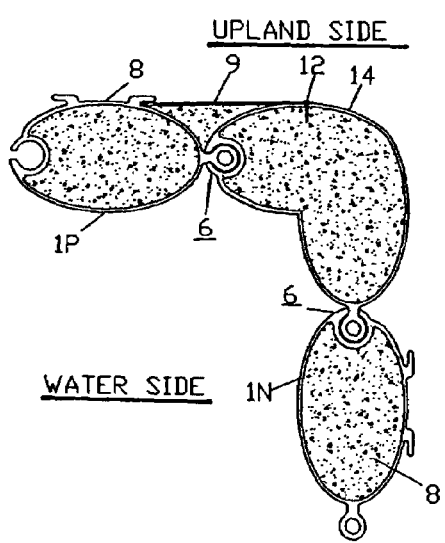
Figure 4E:
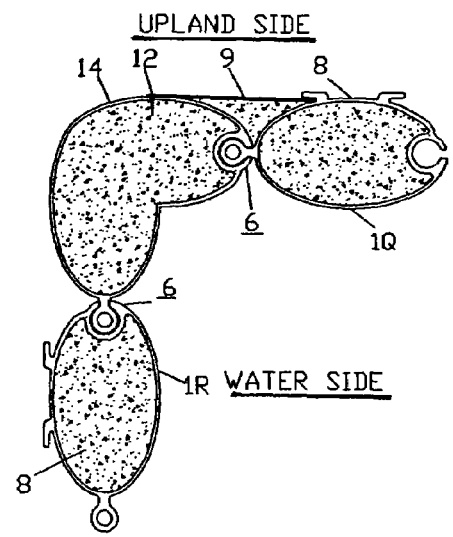

Referring now to FIGS. 2B and 2C, an alternate embodiment of stiffening and further waterproofing the elliptical seawall tubular member junctions is there shown. Rather than using the concrete fill method previously described, molded elongated plastic fill plates 28 are positioned within the narrowing section widths between each of the tubular members 1. These fill plates 28 are held in position by adhesive means and further, on the landside thereof, by backwater plates 47 which are held in place by lag bolts 48 threadably engaged into wooden rebars 28 which are generally coextensive with the tubular members 1.

Referring now to FIG. 3, inside and outside 45° curves using standard elliptical seawall tubular members 1 are there shown. Seawall tubular member 1B may be rotated up to 45° degrees from tubular member 1A by enlarging the female socket 2 in tubular member 1A. This enlargement can be made by simply running a circular saw lengthwise along the female socket 2 on the upland side thereof to remove excess interfering material. After installation of elliptical seawall tubular members 1A and 1B, a metal or plastic plate 9' is then flexed and pushed down between receiving slot 5 of section 1B and the backside of slat 5 of section 1A. After pushing the lower end of plate 9' completely downwardly into the bottom ground, the concrete form assembly is completed by fastening with a common sheet metal screw 12 near the upper end thereof into the land side of section 1A in the vicinity of receiving slot 5 as shown to prevent leakage of cement 8A' during the filling process.

Tubular member 1C may also be rotated up to 45° in the opposite from that of tubular member 1B by cuttingly enlarging the female socket 2 in tubular member 1B as above described. Another metal or plastic plate 9" is then flexed and forced downwardly under receiving slot 5 of tubular member 1C and simultaneously under receiving slot 5A of tubular member 1B to form the triangular concrete fill section 8A between elliptical seawall tubular members 1B and 1C.

FIG. 4 discloses fabricating inside and outside turns of up to 90 degrees using a flat template set (not shown). By using two overlapping templates (not shown) and positioning the first aligned over one of the seawall tubular members 1D and then rotating the second template in the desired new seawall direction and then marking both tubular members at 51A and 52A lengthwise cuts on both tubular members 1D and 1E are made to obtain the desired direction change. The first seawall section 1D will provide the male extension 3 and the second seawall section 1E will provide the female socket 2. The cut tubular member portions 1D and 1E may then be joined by using a metal or plastic sheet 9 such as describe previously, to overlap inside the body sections of both pieces and to receive conventional stainless steel rivets 49.

The above turn disclosed in FIG. 4 may easily range between 45° to 90° and made on the job site. However, for the more usual 90° or right angle turns, the manufacturer may extrude the shape of the more usual 90° turn 14 as shown in FIG. 4B, FIG. 4D and FIG. 4E or provide a factory preassembled 90° turn 11 as shown in FIG. 4C. Both manufactured turns can be turned end for end to produce either an inside 90° turn 11 or 14 as shown in FIG. 4B and FIG. 4C or a 90° outside turn shown in FIGS. 4D and 4E.

Referring now to FIG. 5, a seawall installation may require a groin or jetty extension of the seawall into the waterside installed at an approximate 90 degrees to the run of the conventional seawall. The seawall generally defines the margin or boundary between the water and the upland grounds. The "groin" serves in most cases to protect any ground or bottom from erosion, while a jetty protects a channel from erosive currents parallel to the seawall. In cases where a groin or jetty is attached to the conventional seawall is disclosed in FIG. 5. Three types of groins or jetties and the attachment to the elliptical seawall tubular members 1 are there shown as a double run 81, single run 82 or single run with conventional waler ties 80. Each is shown attached to the previously disclosed elliptical seawall tubular members 1.

It is an object of this invention to produce a seawall section that is many times stronger than the conventional polyvinyl chloride (PVC) or fiberglass reinforced plastic tubular members, easier to install and more aesthetically pleasing than concrete, and both stronger and longer lasting than wood. Because of this, strength advantage is usually not required to have reinforcement walers 17 as shown in 80. However, if walers 17 are used, conventional corrosion resistance tie bolts 76 with nuts 77 and washers 78 must be used to hold the walers 17 in position. Reinforcement bars 79 buried in concrete provide the tie to the seawall. It is preferable to use a fiberglass-reinforced material for the reinforcement bars 79. The groin shown at 82 is an acceptable structure in low to moderate wash areas, while the double run shown at 81 is a preferred choice in areas where the rip currents are higher or with a higher exposed height above the bottom ground.

An even stronger free-standing groin (not shown) can be achieved by driving the tubular members at a slight angle, with only the top of the elliptical seawall sections in contact. In this type installation the fiberglass reinforcement bars 79 should be replaced with a corrosion resistance thread stock 84 shown at 83 with two sets of nuts 77 and washers 78.

Turning now to FIGS. 6, 6A, and 6B, reusable concrete forms 23 and 24 shown in use in FIG. 1 are further detailed. In FIG. 6, the waterside forms 24 with tabs 37 supporting the cement catch basin 35 are shown. The landside form 23 is shown on the opposite side of the seawall tubular members 1 and the spanner bands 22 span the seawall tubular members 1 to the outside wall of both landside and waterside forms 23 and 24. Note that these forms 23 and 24 act to hold the tops of the seawall tubular members in alignment as well as to form a funnel to direct the poured concrete 8 into the bodies of the seawall 1 and the triangular areas shown as 8A. By continuing to fill the area between the forms 23 and 24 and then leveling the top surface, the concrete cap 10 is formed, thereby resulting in a monolithic concrete pour that is both stronger and less expensive to install.

FIG. 6A also shows a plan view of the waterside form 24 with attached tabs 37, concrete catch basin pin 39, landside form 23 and the spanner bands 22. FIG. 6B shows the landside and waterside forms 23 and 24 with spanner bands 22 in place over the seawall tubular members 1.

The overwhelming advantage of this seawall system is the combination of the cost/strength ratio of concrete to the aesthetic and utilitarian value of the thermoplastic connectable form. As shown in FIG. 7, the relative strength of a conventional PVC or fiberglass seawall section 91 is compared to like width and length seawall tubular members 1 having either a wood reinforcement 92 or strong back and a concrete fill 93, and being supported at two knife edge supports 90 and 90'. The downward applied force created by a uniformly increasing load 94 on a conventional seawall section 91, the downward applied force created by a uniformly increasing load 95 on the wood reinforced tubular members 92, and the downward applied force created by a uniformity increasing load 96 on the concrete reinforced tubular members 93 are shown as triangles representing the relative force distribution. The size of the load triangles represents the relative total force that can be applied to each system to produce a standard deflection. In this example the elliptical seawall tubular members 92 with wood reinforcement 29 nearly 4 times the strength of the conventional "Z" section 91 and the concrete filled tubular member 93 within concrete fill 8 are shown to support twenty four times the load of the thermoplastic "Z" type section 91, with the use of only 17 percent additional plastic material.

The cost of the concrete is negligible compared to the cost of wood reinforcement (waler) and additional tiebacks used to achieve a seawall system that is designed for only half the strength of the installed elliptical seawall tubular members and monolithic cap shown in FIG. 1. Also shown in FIG. 7 are the relative strength to cost ratios shown as blocks 97, 98 and 99. Referenced to the cost to strength ratio of the concrete filled elliptical seawall tubular member 93, the conventional "Z" section 91 is nearly 20 times more expensive. The wood reinforced tubular member 92 is nearly 5 times as costly as the concrete filled tubular member 93 on a strength to cost basis.

Figure 8:
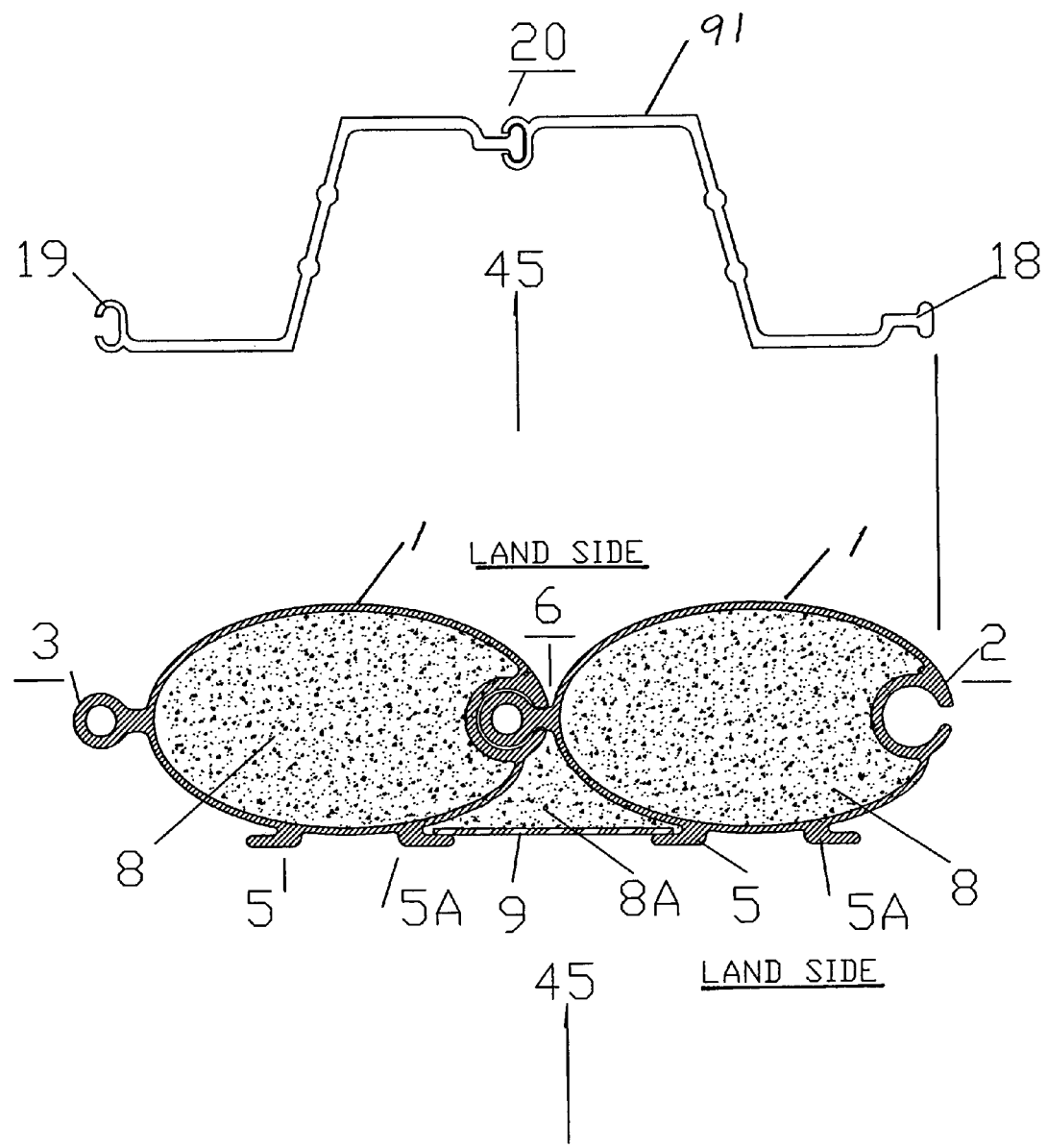
FIG. 8 is a top plan view of the commercially available "Z" seawall sections and two concrete filled elliptical seawall tubular members.

FIG. 8 is a plan view of the prior art metal or fiberglass "Z" section of seawall 91 having interlocking edge or side margins 18 and 19 which lockingly engage together along 20, alongside two seawall tubular members 1 as previously described joined along 6 and including the concrete fill 8. This drawing further demonstrates the advantage of using a concrete filled tubular member to achieve a favorable strength/cost ratio. Load is the direction of load applied to the seawall, showing how this load deflects the weak joint of 20 versus the reinforced joint of 6.

Figure 9:
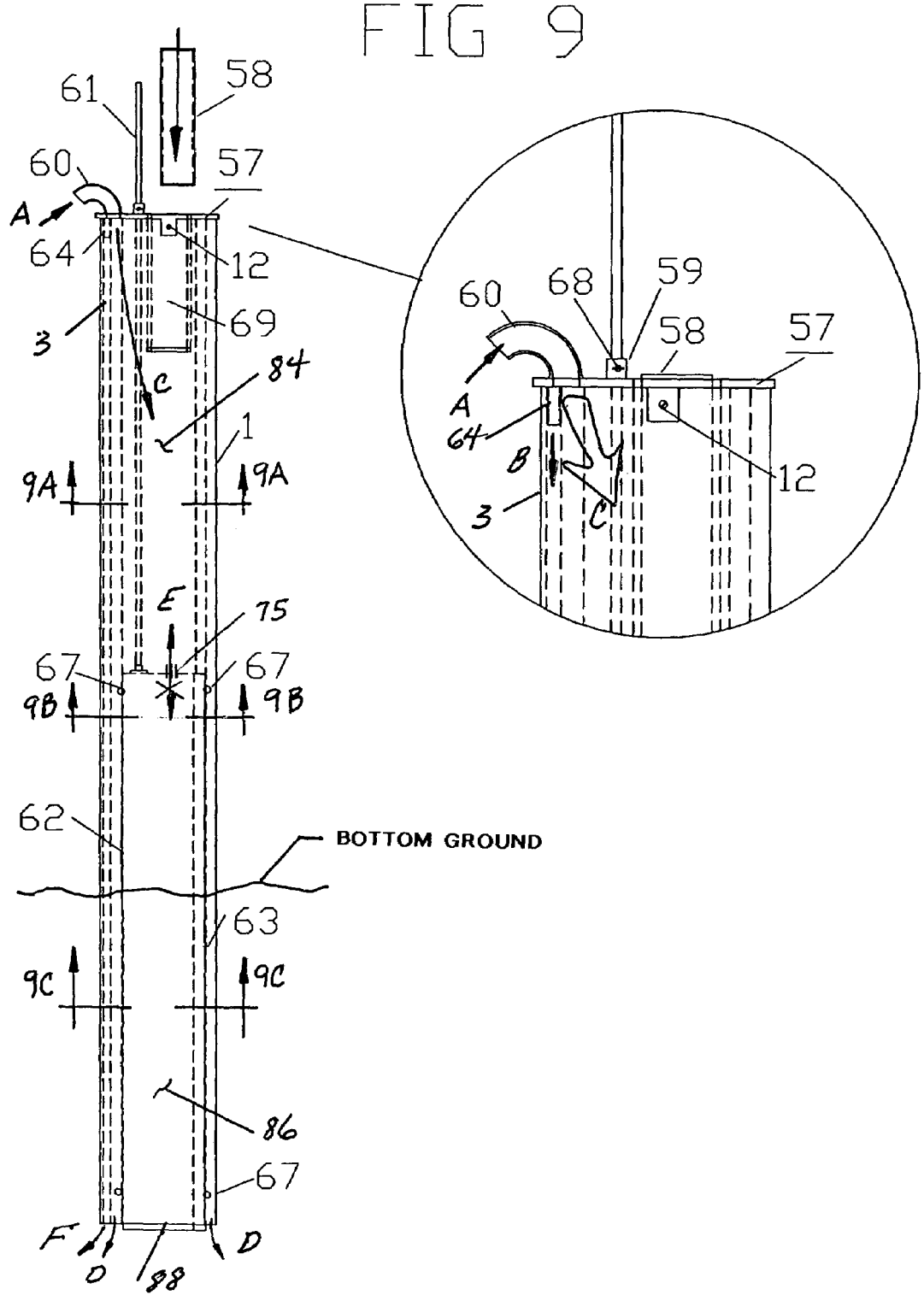
FIG. 9 is a side elevation view of the jet/drive apparatus and enlarged portion thereof for placement of each elliptical seawall tubular member into the ground.
Figure 9A:
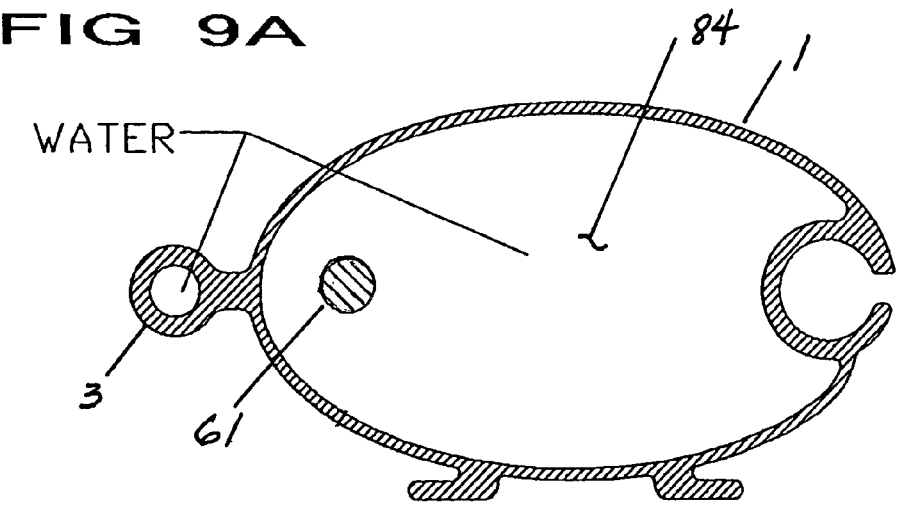
FIGS. 9A to 9C are cross sections through arrows 9A-9A, 9B-9B and 9C-9C of FIG. 9.
Figure 9B:
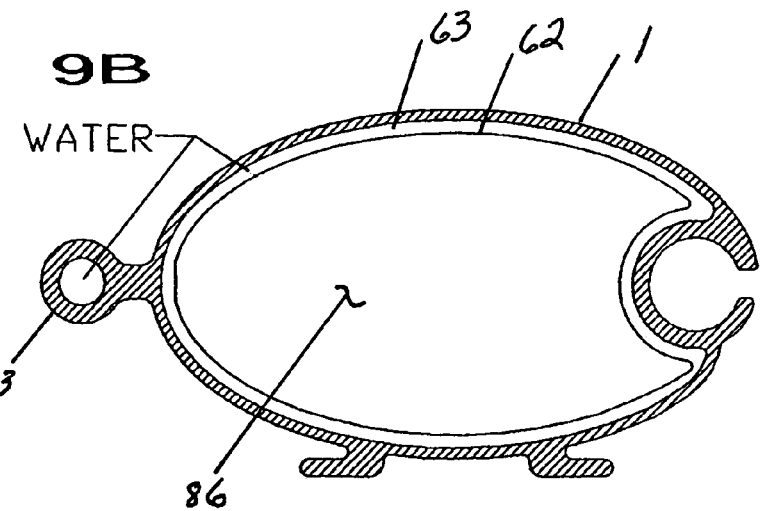
Figure 9C:
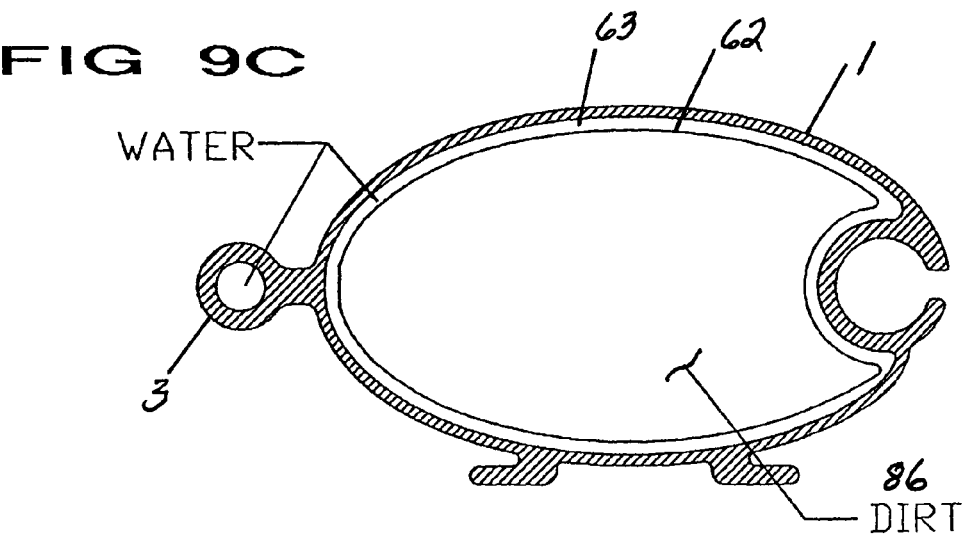

A preferred driving or installation method is disclosed in FIGS. 9, 9A, 9B and 9C. The same resistance to bending that is demonstrated by an elliptical design versus the flat design shown in FIG. 8 is utilized to assure that each seawall tubular member 1 will not "lead off" from it's initiated direction. A water injection jet 60 utilizes an inside bell 62 to direct a jet of wash water A downwardly to the leading edge 88 of the elliptical seawall tubular member through a narrow but uniform chamber or water passage 63 between the bell 62, and the seawall section 1 as best seen in FIGS. 9B and 9C.

The water jet A is first divided and forced into a socket wash 64 which maintains a water wash downwardly through the interior of the hollow ball 3 which discharges in the direction of arrow F. The bulk of the water discharges initially into the hollow interior 84 of the tubular member 1 in the direction of C and then downwardly within the narrow channel or water passage 63 as best seen in FIGS. 9B and 9C formed between the interior surface of the tubular member 1 and the outer surface of a mating inside bell 62 which formed having the outer surface thereof substantially similar to that of the interior surface of the tubular member 1. The water then flows downwardly within this circumferential water chamber 63 and discharges in the direction of arrow D as seen in FIG. 9. This uniform chamber 63 is maintained by a minimum of six small pins 67. The seawall tubular member thus sinks into the bottom ground facilitated by the rapid water discharge flow at D. The weight and extension of the bell 62 below the leading edge 88 of the seawall tubular member 1 is supported and set by a threaded height adjustment rod 61 threadably engaged into a collar 59 and secured by a thumbscrew 68. A cap assembly 57 is fastened to the upper end of the seawall tubular member 1 by common sheet metal screws 12 and supports the water injection pipe 60, the adjustment collar 59 and the joint clean-out nozzle 64. Again, the nozzle 64 injects water into the hollow center of the male ball protrusion 3 of the seawall tubular member 1, thus cleaning the slot of the previously driven seawall section as the male ball protrusion of the instant seawall tubular member 1 moves down the female open slot 2 of the previously driven seawall tubular member.

An auxiliary drive feature is also provided to assist the sinking of the seawall section 1 into the bottom ground. An impact cylinder 58 which fits into a drive well 69 is used as a land for a small sledge hammer (not shown). A small commercial electric or pneumatic hammer (not shown) may also be used against impact cylinder 58 to drive the tubular member 1.

The seawall tubular members 1 may also be modified as shown in FIG. 10 to provide a concrete boat ramp 100 or the like that can be assembled near the point of use and pulled into position. FIG. 10 discloses the method of modifying the elliptical seawall tubular members 1 by cutting each section along a plane originating at, and extending between, edges 106 and 106' of end plates 105. The modified seawall tubular members 1' are then bolted loosely together using tie rod bolts 107, stainless steel link bars 101 and hex nuts 102. The end plates 105 are then slipped into place and the cement 8 is add into the modified tubular members 1'. After the concrete cures, the end plates 105 are removed and reused. After tightening the nuts 102, the ramp 100 may now be dragged into place as a removable mat or boat ramp.

While the instant invention has been shown and described herein in what are conceived to be the most practical and preferred embodiments, it is recognized that departures may be made therefrom within the scope of the invention which is therefore not to be limited to the details disclosed herein, but is to be afforded the full scope of the claims so as to embrace any and all equivalent apparatus and articles.

The invention claimed is:

1. A seawall element comprising:
   an elongated tubular member formed as a unit of plastic material having a cylindrical hollow elliptic or oval-shaped cross section of substantially uniform wall thickness and open at each end thereof;
   said tubular member having slidably mating interlocking male ball and female pocket portions along the length of either side, respectively, of said tubular member for interlocking two side by side said tubular members together by slidable overlapping engagement lengthwise one said tubular member to another without additional external fastening or connecting means therebetween;
   each said tubular member including two spaced opposing plate receiving slots positioned on an outer surface of said tubular section and oriented, when two of said tubular members are interlockingly engaged one to another, to slidably receive a plate to form a generally triangular concrete reinforcing cavity between each two interlocked said tubular members.

2. A seawall structure comprising:
   a plurality of seawall elements each including:
      an elongated tubular member formed as a unit of plastic material having a cylindrical hollow elliptic or oval-shaped cross section of substantially uniform wall thickness and open at each end thereof;
      said tubular member having slidably mating interlocking male ball and female pocket portions along the length of each side, respectively, of said tubular member for interlocking two side by side said tubular members together by slidable overlapping engagement lengthwise one said tubular member to another without additional external fastening or connecting means therebetween;
      each said tubular member including two spaced opposing plate receiving slots positioned on an outer surface of said tubular section and oriented, when two of said tubular members are interlockingly engaged one to another, to slidably receive a plate to form a generally triangular concrete reinforcing cavity between each two interlocked said tubular members;
   an elongated poured concrete reinforcing and connecting cap extending along and interconnecting an upper end portion of each of said tubular members, said concrete extending monolithically downward from said cap into each of said tubular members and each of said reinforcing cavities.

3. An apparatus for installing an elongated seawall tubular member into bottom ground beneath water, said seawall tubular member comprising:
   the elongated said tubular member formed as a unit of plastic material having a cylindrical hollow elliptic or oval-shaped cross section of substantially uniform wall thickness and open at each end thereof;
   said tubular member having slidably mating interlocking male ball and female pocket portions along the length of each side, respectively, of said tubular member for interlocking two side by side said tubular members together by slidable overlapping engagement lengthwise one said tubular member to another without additional external fastening or connecting means therebetween;
   each said tubular member including two spaced opposing plate receiving slots positioned on an outer surface of said tubular section and oriented, when two of said tubular members are interlockingly engaged one to another, to slidably receive a plate to form a generally triangular concrete reinforcing cavity between each two interlocked said tubular members;
   said apparatus comprising:
      an elongated thin wall hollow bell positionable within and generally coextensive with a lower portion of said tubular member, said bell having an outer surface substantially similar to that of, and being slightly smaller than, an interior surface of said tubular member wherein a narrow water passage is formed therebetween;
      a cap assembly sealingly attachable to an upper end of said tubular member and including a pressurized water inlet and a support for said bell, said water inlet directing water under pressure into said water passage for discharge from a lower end thereof whereby, when a lower end of said tubular member is placed atop the bottom ground, water discharging from said water passage washes bottom ground beneath said tubular member away to bury a lower portion of said tubular member into the bottom ground.

4. A seawall element comprising:
   an elongated tubular member formed as a unit of plastic material having a cylindrical hollow elliptic or oval-shaped cross section of substantially uniform wall thickness and open at each end thereof;
   said tubular member having slidably mating interlocking male ball and female pocket portions along the length of either side, respectively, of said tubular member for interlocking two side by side said tubular members together by slidable overlapping engagement lengthwise one said tubular member to another without additional external fastening or connecting means therebetween;
   each said tubular member including two spaced opposing plate receiving slots positioned on an outer surface of said tubular section and oriented, when two of said tubular members are interlockingly engaged one to another, to slidably receive a plate to form a generally triangular concrete reinforcing cavity between each two interlocked said tubular members;
   a conical-like shaped driving tip formed of concrete and secured into an open lower end of said tubular member, said driving tip penetrating into bottom ground to facilitate installation by repeated impact against an upper end of said tubular member;
   said driving tip including a longitudinally extending water channel formed therethrough;
   said water channel discharging pressurized water which is introduced into said tubular member in a downwardly direction from a lower distal portion of said driving tip to loosen, clear and disperse soil directly beneath said driving tip to facilitate installation of said tubular member into bottom ground.

* * * * *